US012789308B2

(12) United States Patent
Schmidt et al.

(10) Patent No.: US 12,789,308 B2
(45) Date of Patent: Nov. 10, 2026

(54) UNLOADING METHOD AND MECHANICAL UNLOADING ARRANGEMENT FOR UNLOADING A MACHINING PRODUCT OF A WORKPIECE MACHINING OPERATION, PRODUCTION METHOD AND MECHANICAL PRODUCTION ARRANGEMENT

(71) Applicant: TRUMPF Werkzeugmaschinen SE + Co. KG, Ditzingen (DE)

(72) Inventors: Andreas Schmidt, Hochkirch (DE); Patrick Wowtscherk, Neschwitz (DE); Markus Wowtscherk, Ralbitz-Rosenthal OT Schönau (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 41 days.

(21) Appl. No.: 19/181,407

(22) Filed: Apr. 17, 2025

(65) Prior Publication Data

US 2025/0332677 A1 Oct. 30, 2025

Related U.S. Application Data

(63) Continuation of application No. PCT/EP2023/078663, filed on Oct. 16, 2023.

(30) Foreign Application Priority Data

Oct. 21, 2022 (DE) ..................... 10 2022 127 852.2

(51) Int. Cl.
*B23Q 7/00* (2006.01)
*B23K 26/70* (2014.01)
(Continued)

(52) U.S. Cl.
CPC ............ *B23Q 7/006* (2013.01); *B23K 26/702* (2015.10); *B65G 47/917* (2013.01);
(Continued)

(58) Field of Classification Search
CPC .. B23Q 7/006; B23Q 2707/00; B23K 26/702; B23K 2101/18; G05B 19/4182; B65G 47/917; B65G 2207/46
See application file for complete search history.

(56) References Cited

U.S. PATENT DOCUMENTS 5,450,333 A 9/1995 Minami et al.
6,189,424 B1 * 2/2001 Wheeling ............ B23Q 11/005 82/127

(Continued)

FOREIGN PATENT DOCUMENTS

DE 4409195 A1 9/1994
DE 10343891 A1 5/2005

(Continued)

*Primary Examiner* — James R Bidwell
(74) *Attorney, Agent, or Firm* — LEYDIG, VOIT & MAYER, LTD.

(57) ABSTRACT

An unloading method for unloading a machining product of a workpiece machining operation from a product support is provided. The method includes moving the machining product with a transfer movement along a transfer axis into an unloading region including a spatial unloading region limit located along the transfer axis and an unloading region length along the transfer axis which is larger than an actual product length of the machining product along the transfer axis; and continuing the unloading operation after the machining product has been provided for unloading. A reference length extends along the transfer axis and is at least the actual product length. After completion of the transfer movement, a distance along the transfer axis is compared with the limit distance from the reference point, (Continued)

and the unloading operation is continued only under a condition that the distance is less than the limit distance.

13 Claims, 2 Drawing Sheets

(51) Int. Cl.

| | |
|---|---|
| ***B23K 101/18*** | (2006.01) |
| ***B65G 47/91*** | (2006.01) |
| ***G05B 19/418*** | (2006.01) |

(52) U.S. Cl.
CPC ...... *B23K 2101/18* (2018.08); *B23Q 2707/00* (2013.01); *B65G 2207/46* (2013.01); *G05B 19/4182* (2013.01)

(56) References Cited

U.S. PATENT DOCUMENTS

| | | | | |
|---|---|---|---|---|
| 7,444,850 | B2 | 11/2008 | Bauersachs et al. | |
| 9,002,507 | B2 | 4/2015 | Mattern et al. | |
| 10,040,199 | B2 * | 8/2018 | Ito | B25J 9/1612 |
| 11,390,469 | B2 | 7/2022 | Satou | |
| 11,623,266 | B2 * | 4/2023 | Morita | B26D 7/32 209/707 |
| 12,686,129 | B2 * | 7/2026 | Subbaiah | B25J 9/1679 |
| 2017/0176178 | A1 * | 6/2017 | Inukai | B25J 9/1612 |
| 2021/0114207 | A1 | 4/2021 | Ottnad et al. | |
| 2024/0246233 | A1 | 7/2024 | Subbaiah | |
| 2025/0326023 | A1 * | 10/2025 | Böhme | B23K 37/0408 |

FOREIGN PATENT DOCUMENTS

| | | | |
|---|---|---|---|
| DE | 102012013031 | A1 | 4/2014 |
| DE | 102019106339 | A1 | 9/2019 |
| DE | 102020109950 | A1 | 11/2020 |
| EP | 3560652 | A1 | 10/2019 |
| WO | WO 2022239703 | A | 11/2022 |

* cited by examiner

UNLOADING METHOD AND MECHANICAL UNLOADING ARRANGEMENT FOR UNLOADING A MACHINING PRODUCT OF A WORKPIECE MACHINING OPERATION, PRODUCTION METHOD AND MECHANICAL PRODUCTION ARRANGEMENT

CROSS REFERENCE TO RELATED APPLICATIONS

This application is a continuation of International Application No. PCT/EP2023/078663 (WO 2024/083735 A1), filed on Oct. 16, 2023, and claims benefit to German Patent Application No. DE 10 2022 127 852.2, filed on Oct. 21, 2022. The aforementioned applications are hereby incorporated by reference herein.

FIELD

The invention relates to an unloading method for unloading a machining product of a workpiece machining operation from a product support. The invention also relates to a mechanical unloading arrangement for carrying out the aforementioned unloading method and to a production method, in the context of which the aforementioned unloading method is carried out, and to a mechanical production arrangement for carrying out said production method.

BACKGROUND

Prior art of the type in question is known from EP 3 560 652 A1.

The prior art relates to a machining system for separating sheet metal. The sheet metal machining operation takes place in a working region of a laser cutting machine that is enclosed in a housing. The sheet metal to be machined is fed into the working region of the laser cutting machine together with a pallet storing the sheet metal. In the working region of the laser cutting machine, cut-out sheet metal parts and a skeleton enclosing the sheet metal parts are produced from the sheet metal stored on the pallet as machining products. After the separating sheet metal machining operation has been completed, the sheet metal parts and the skeleton are moved together with the pallet through an opening provided in the housing of the laser cutting machine into an unloading region of the machining system. The unloading region is limited towards the laser cutting machine by a wall of the housing of the working region of the laser cutting machine. A fully automated or partially automated handling device can be used to unload the pallet transferred to the unloading region of the machining system.

SUMMARY

In an embodiment, the present disclosure provides an unloading method for unloading a machining product of a workpiece machining operation from a product support. The method includes: making available the machining product for unloading from the product support by moving the machining product with a transfer movement along a transfer axis into an unloading region including a spatial unloading region limit located along the transfer axis and an unloading region length along the transfer axis which is larger than an actual product length of the machining product along the transfer axis; and continuing the unloading operation after the machining product has been provided for unloading. A reference point is defined in the unloading region, from which reference point the spatial unloading region limit has a limit distance along the transfer axis. A reference length, which extends along the transfer axis and is at least equally as large as the actual product length, is defined for the machining product. After completion of the transfer movement, a distance existing along the transfer axis is determined between the reference point and a front end point of the reference length of the machining product in the direction of the unloading region limit. The distance existing along the transfer axis between the reference point and the front end point of the reference length of the machining product is compared with the limit distance from the reference point, and the unloading operation is continued only under a condition that the distance along the transfer axis between the reference point and the front end point of the reference length of the machining product is less than the limit distance from the reference point.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
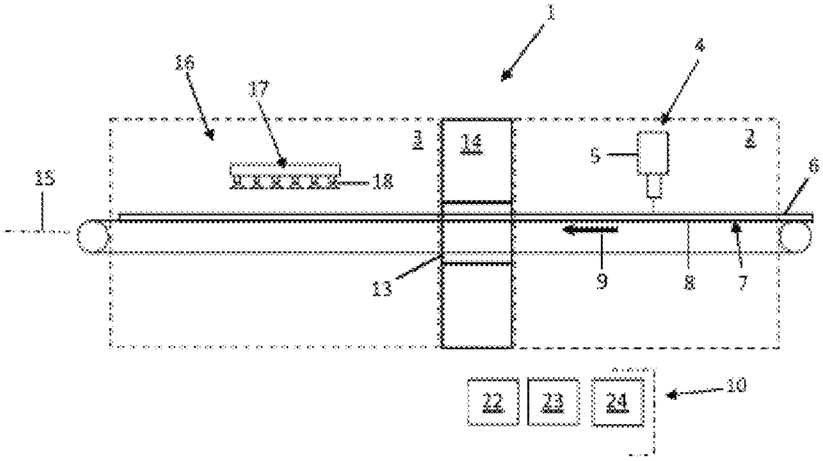
FIG. 1 shows a machine arrangement for sheet metal production having a working region and an unloading region and having a workpiece support belt extending over the working region and the unloading region according to an embodiment of the present invention.

Embodiments of the present invention relate to an unloading method for unloading a machining product of a workpiece machining operation, and in particular embodiments a sheet metal machining operation, from a product support, wherein the machining product is made available for unloading from the product support by moving the machining product with a transfer movement along a transfer axis into an unloading region, which has a spatial unloading region limit located along the transfer axis and which has an unloading region length along the transfer axis which is larger than an actual product length of the machining product along the transfer axis, and wherein the unloading operation is continued after the machining product has been provided for unloading.

Embodiments of the present invention enable a functionally reliable unloading of a product support in a spatially limited unloading region.

According to embodiments of the present invention, this is achieved by the mechanical unloading method, the mechanical unloading arrangement, by the mechanical production method, and the mechanical production arrangement.

In an embodiment of the present invention, a reference point is accordingly defined in an unloading region of a mechanical unloading arrangement or a mechanical production arrangement, in which a machining product to be unloaded from a product support has been moved along a transfer axis, from which reference point an unloading region limit has a limit distance along the transfer axis of the workpiece movement. A reference length is defined for the machining product, which extends along the transfer axis and is at least equally as large as the actual product length. After completion of the transfer movement of the machining product, a distance existing along the transfer axis is determined between the reference point on the one hand and a front end point of the reference length of the machining product in the direction of the unloading region limit on the other hand. If the distance along the transfer axis between the reference point and the front end point of the reference length of the machining product is less than the limit distance from the reference point, this indicates that the machining product is arranged with its entire actual length in the unloading region and is therefore ready for unloading from the product support without the risk of subsequent collision with the unloading region limit. Only under this condition will the unloading operation for the machining product continue after it has been made available.

In cases where several machining products are to be unloaded from a product support, for example when unloading a plurality of sheet metal parts that have previously been produced from a sheet metal panel with a defined sheet metal part allocation, the unloadability test according to an embodiment of the present invention is carried out for each of the machining products or sheet metal parts.

A numerical arrangement control of the unloading arrangement according to an embodiment of the present invention is designed to implement the unloading method according to the embodiment of the present invention.

A product pallet or a product support belt can be used as a product support for providing a machining product to be unloaded. Both the product pallet and the product support belt can already store the workpiece from which the machining product to be unloaded is produced.

For cases in which the inventive test of the feasibility of the unloading operation has led to a positive result, in an advantageous embodiment of the present invention, an unloading element of a mechanical unloading device is arranged on the machining product and fixed to the machining product for receiving the machining product provided for unloading with an arrangement defined with respect to the machining product.

In a preferred embodiment of the present invention, the unloading element is configured for the specific unloading task by adapting the dimensions of the unloading element to the dimensions of the machining product provided for unloading.

Additionally or alternatively, the unloading element is arranged on the machining product to be unloaded such that a maximum number of holding elements, for example holding suction cups, of the unloading element come into contact with the machining product.

An embodiment of the present invention relates to an unloading method with special practical kinematics of the unloading movement to be carried out by the unloading element of the unloading device together with the machining product fixed thereto. In detail, the unloading element and the machining product fixed thereto are to be removed jointly as an unloading unit from the workpiece support with an unloading movement which has an unloading rotational movement of the unloading unit arranged in a rotational position about an unloading axis of rotation which runs in the unloading region of the product support along the unloading region limit. After it has been ensured in the above manner that the machining product to be unloaded has been completely transferred into the unloading region of the mechanical unloading arrangement, it is checked whether the unloading rotational movement of the unloading unit consisting of the machining product and the unloading element can be carried out without the unloading unit colliding with the unloading region limit.

For this purpose, an enveloping circle concentric with the unloading axis of rotation is defined for the unloading unit, within which the unloading unit is arranged. If the radius of the enveloping circle of the unloading unit is less than the distance of the unloading axis of rotation from the unloading region limit existing in the radial direction of the unloading axis of rotation, it is ensured that the unloading rotation movement of the unloading unit can be carried out without the unloading unit colliding with the unloading region limit.

The numerical arrangement control of the unloading arrangement according to an embodiment of the present invention and the production arrangement according to an embodiment of the present invention is further developed accordingly.

Embodiments of the present invention will be explained in more detail below on the basis of exemplary schematic illustrations.

As shown in FIG. 1, a machine arrangement 1 for sheet metal production has a working region 2 and an unloading region 3. In the working region 2, a laser cutting machine 4 is arranged in a known manner as a machining device for separating sheet metal machining. A laser cutting head 5 of the laser cutting machine 4 is shown in FIG. 1.

The laser cutting machine 4 is used for separating a sheet metal strip 6 which has previously been unwound from a coil. For storing the sheet metal strip 6 in the working region 2 and in the unloading region 3 of the machine arrangement 1, an endless workpiece support belt 7 is provided as a product support, which is driven by means of a conventional transfer drive and whose upper run 8 then moves in a feed direction 9.

Figure 2:
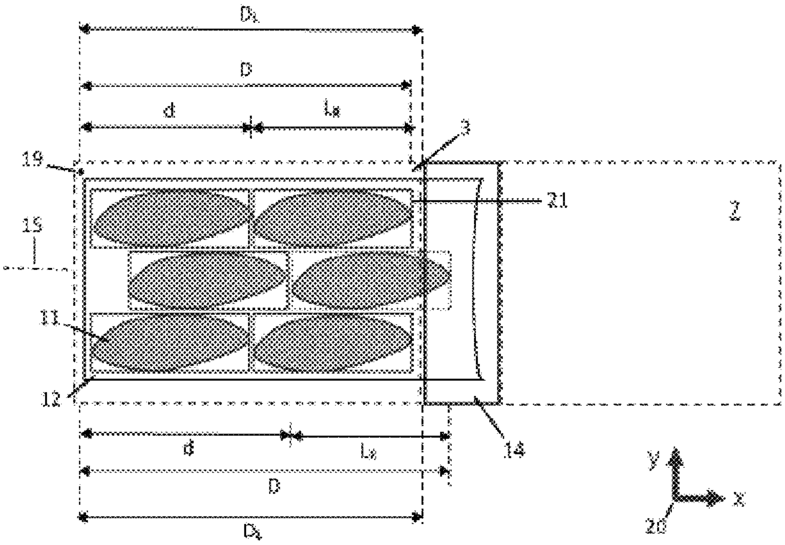
FIG. 2 shows a first unloading situation on the machine arrangement according to FIG. 1 with a view of the workpiece support belt according to an embodiment of the present invention.
Figure 3:
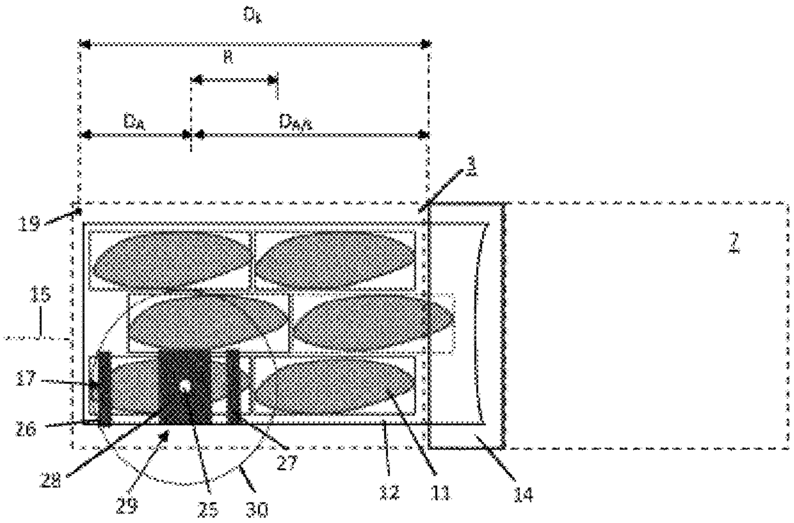
FIG. 3 shows a second unloading situation on the machine arrangement according to FIG. 1 with a view of the workpiece support belt according to an embodiment of the present invention.
Figure 4:
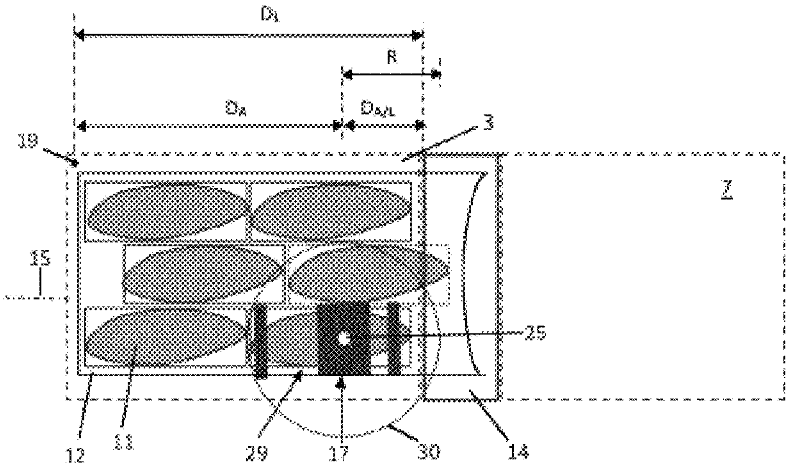
FIG. 4 shows a third unloading situation on the machine arrangement according to FIG. 1 with a view of the workpiece support belt according to an embodiment of the present invention.

The sheet metal strip 6 is machined in sections in the working region 2 of the machine arrangement 1 while the workpiece support belt 7 is stopped. For separating a sheet metal strip section, the laser cutting head 5 of the laser cutting machine 4 is moved in a known manner with a two-axis movement in a horizontal plane relative to the sheet metal strip 6. The laser cutting head 5 cuts finished parts 11 from the sheet metal strip 6 as machining products according to an allocation plan for the sheet metal strip 6 stored in a numerical arrangement control 10 of the machine arrangement 1. In addition, during the separating machining of the sheet metal strip 6, a skeleton 12 is produced surrounding the finished parts 11 (FIGS. 2 to 4).

Once the separating machining of a sheet metal strip section has been completed, the workpiece support belt 7 is advanced in the feed direction 9 together with the sheet metal strip 6 supported by the upper run 8 by means of the transfer drive. The finished parts 11 cut out from the sheet metal strip 6 pass together with the skeleton 12 through a passage opening 13 of a partition wall 14 which separates the working region 2 and the unloading region 3 of the machine arrangement 1 from one another. As a result, the machined section of the sheet metal strip 6 reaches the unloading region 3 of the machine arrangement 1 along a transfer axis 15 defined by the feed direction 9.

The loading region length of the unloading region 3 extending along the transfer axis 15 is larger than the actual length of the individual finished parts 11 (actual product length) also extending along the transfer axis 15. When the workpiece support belt 7 is then stopped once again, the previously produced finished parts 11 are prepared for unloading from the workpiece support belt 7 in the unloading region 3.

In the unloading region 3, a conventional unloading robot 16 is provided as a mechanical unloading device, of which only one unloading element designed as a suction frame 17 is shown in FIG. 1 for the sake of simplicity. The suction frame 17 has a plurality of holding suction cups 18 as holding elements on the workpiece side. As with the other essential functional units of the machine arrangement 1, the unloading robot 16 is also controlled by the numerical arrangement control 10.

Appropriate programming of the machine arrangement control 10 ensures that the workpiece support belt 7 can be unloaded in the unloading region 3 of the machine arrangement 1 by means of the unloading robot 16 in a fault-free manner.

For this purpose, a reference point 19 in the unloading region 3 is stored in the numerical arrangement control 10 with a position defined in a coordinate system 20 of the numerical arrangement control 10 having an x-axis and a y-axis running perpendicular thereto. In addition, an imaginary enveloping rectangle 21 is stored in the numerical arrangement control 10 for each of the finished parts 11, the sides of which run in the direction of the x-axis and in the direction of the y-axis of the coordinate system 20 of the numerical arrangement control 10. The enveloping rectangle 21 is dimensioned such that the finished part 11 in question lies completely within the interior of the rectangle 21. The long side of the enveloping rectangle 21 represents a reference length $L_R$ extending along the transfer axis 15 and is at least as large as the actual product length of the finished part 11 along the transfer axis 15. Also stored in the numerical arrangement control 10 is a limit distance $D_L$ between the reference point 19 and the partition wall 14 forming an unloading region limit.

An unloading operation can only be carried out in a fault-free manner by means of the unloading robot 16 under the condition that the finished part 11 to be unloaded has been completely transferred into the unloading region 3 of the machine arrangement 1 and has consequently completely passed through the partition wall 14.

This condition is checked for each of the finished parts 11 provided for unloading before the unloading robot 16 is activated. In this case, a distance d between the reference point 19 and a reference point-side end of the reference length L R is measured by means of a measuring unit 22 of the numerical arrangement control 10. The distance d and the reference length $L_R$ of the finished part 11 are added together in an evaluation and comparison unit 23 of the numerical arrangement control 10 and the distance D existing along the transfer axis 15 between the reference point 19 and the front end point of the reference length $L_R$ situated in the direction of the partition wall 14 of the finished part 11 is thereby determined. The distance D between the reference point 19 and the front end point of the reference length $L_R$ of the finished part 11 is then compared with the limit distance $D_L$.

A continuation of the unloading operation by means of the unloading robot 16 is initiated by the numerical arrangement control 10 only under the condition that the distance D existing along the transfer axis 15 between the reference point 19 and the front end of the reference length $L_R$ of the finished part 11 in question is less than the limit distance $D_L$.

This condition is fulfilled by all finished parts 11 in FIG. 2, with the exception of the finished part 11 on the right in the middle row of finished parts. For example, the finished part 11 on the right in the upper row of finished parts can be unloaded. As shown in FIG. 2, for this finished part 11, the distance D existing along the transfer axis 15 between the reference point 19 and the front end of the reference length $L_R$ is less than the limit distance $D_L$. For the finished part 11 on the right in the middle row of finished parts, however, the distance D between the reference point 19 and the front end of the reference length $L_R$ is larger than the limit distance $D_L$.

A control unit 24 of the numerical arrangement control 10 consequently controls the unloading robot 16 to unload all the finished parts 11 with the exception of the finished part 11 on the right in the middle row of finished parts. The finished part 11 on the right in the middle row of finished parts, which would collide with the partition wall 14 during an unloading operation due to its partial overlap with the latter, initially remains on the workpiece support belt 7. The unloading of this finished part 11 can, for example, take place after a corresponding further advance of the sheet metal strip 6 in the feed direction 9.

FIGS. 3 and 4 illustrate unloading situations on the workpiece support belt 7 which differ from the unloading situation according to FIG. 2, in that the finished parts 11 provided for unloading in the unloading region 3 must execute an unloading rotational movement about an unloading axis of rotation 25 immediately after being lifted from the workpiece support belt 7 in a rotational position then assumed together with the suction frame 17 fixed to the respective finished part 11. The unloading axis of rotation 25 runs perpendicular to the workpiece support belt 7 along the partition wall 14.

Before being applied to the finished part 11 in question, the suction frame 17 was configured to be transferred to an unloading readiness state by adjusting its extension along the transfer axis 15. For this purpose, outer frame elements 26, 27 of the suction frame 17 were positioned with respect to a central frame element 28 such that the resulting dimensions of the suction frame 17 along the transfer axis 15 are ideally matched to the corresponding dimensions of the finished part 11 to be unloaded. The suction frame 17 configured in this way was arranged on the respective finished part 11 such that the finished part 11 can be fixed to the suction frame 17 by means of a maximum number of holding suction cups 18.

In order to check the unloading capability of the finished part 11 in question, it is first checked in the manner described above for FIG. 2 whether the finished part 11 provided for unloading is completely arranged within the unloading region 3 of the machine arrangement 1. In the example case shown, the finished part 11 on the left in the lower row of finished parts (FIG. 3) and the finished part 11 on the right in the lower row of finished parts (FIG. 4) are recognized as being capable of being unloaded.

In the next step, it is then checked whether the finished parts 11 arranged entirely within the unloading region 3 of the machine arrangement 1 can carry out the required unloading rotational movement.

For this purpose, an imaginary enveloping circle 30 is defined for an unloading unit 29 consisting of the finished part 11 to be unloaded and the suction frame 17 attached thereto and is stored in the machine arrangement control 10. The enveloping circle 30 runs concentrically with the unloading axis of rotation 25 and its radius R is dimensioned such that the unloading unit 29 is arranged completely within the enveloping circle 30.

Subsequently, by means of the measuring unit 22 of the machine arrangement control 10, a distance $D_A$ existing along the transfer axis 15 between the reference point 19 and the unloading axis of rotation 25 is measured. By means of the evaluation and comparison unit 23, the difference between the limit distance $D_L$ and the distance $D_A$ the distance $D_{A/L}$ is then calculated, which represents the distance between the unloading axis of rotation 25 and the partition wall 14. By comparing the distance $D_{A/L}$ of the unloading axis of rotation 25 from the partition wall 14 with the radius R of the enveloping circle 30, it is determined by means of the evaluation and comparison unit 23 that the distance $D_{A/L}$ is larger than the radius R of the enveloping circle 30, from which it is concluded that the unloading unit 29 comprising the finished part 11 and the suction frame 17 can carry out the rotational movement about the unloading axis of rotation 25 required for unloading the finished part 11 without colliding with the partition wall 14. In this case, the control unit 24 controls the unloading robot 16 to carry out the unloading operation. Conditions of this type are shown in FIG. 3.

In the conditions shown in FIG. 4, when comparing the distance $D_{A/L}$ the unloading axis of rotation 25 from the partition wall 14 with the radius R of the enveloping circle 30 of the unloading unit 29, it is determined that the distance $D_{A/L}$ is less than the radius R and that consequently the unloading unit 29 would collide with the partition wall 14 during the rotational movement to be carried out about the unloading axis of rotation 25. Based on this knowledge, the unloading operation for the finished part 11 of the unloading unit 29 is not continued under the conditions shown in FIG. 4. Even under the conditions according to FIG. 4, it is conceivable that the finished part 11, which cannot initially be unloaded, is unloaded from the workpiece support belt 7 after the sheet metal strip 6 has been advanced further in the feed direction 9.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An unloading method for unloading a machining product of a workpiece machining operation from a product support, the method comprising:

making available the machining product for unloading from the product support by moving the machining product with a transfer movement along a transfer axis into an unloading region comprising a spatial unloading region limit located along the transfer axis and an unloading region length along the transfer axis which is larger than an actual product length of the machining product along the transfer axis; and continuing the unloading operation after the machining product has been provided for unloading, wherein a reference point is defined in the unloading region, from which reference point the spatial unloading region limit has a limit distance along the transfer axis, wherein a reference length, which extends along the transfer axis and is at least equally as large as the actual product length, is defined for the machining product, wherein after completion of the transfer movement, a distance existing along the transfer axis is determined between the reference point and a front end point of the reference length of the machining product in the direction of the unloading region limit, wherein the distance existing along the transfer axis between the reference point and the front end point of the reference length of the machining product is compared with the limit distance from the reference point, and the unloading operation is continued only under a condition that the distance along the transfer axis between the reference point and the front end point of the reference length of the machining product is less than the limit distance from the reference point.

2. The unloading method according to claim 1, wherein the unloading method is continued in that an unloading element of a mechanical unloading device is arranged on the machining product and fixed to the machining product for receiving the machining product provided for unloading with an arrangement defined with respect to the machining product.

3. The unloading method according to claim 2, wherein the unloading element is transferred to an unloading readiness state for receiving the machining product provided for unloading in that the dimensions of the unloading element are adapted to the dimensions of the machining product provided for unloading.

4. The unloading method according to claim 2, wherein the machining product provided for unloading is fixed to the unloading element by means of holding elements of the unloading element, and wherein the unloading element is arranged on the machining product provided for unloading with an arrangement which is defined such that the machining product is fixed to the unloading element by a maximum number of the holding elements.

5. The unloading method according to claim 2, wherein for the further continuation of the unloading operation, the unloading element and the machining product fixed thereto are jointly removed as an unloading unit from the product support with an unloading movement which has an unloading rotational movement of the unloading unit arranged in a rotational position about an unloading axis of rotation which runs in the unloading region of the product support along the unloading region limit, wherein an enveloping circle concentric with the unloading axis of rotation is defined for the unloading unit, within which the unloading unit is arranged, wherein a radius of the enveloping circle of the unloading unit is compared with a radial distance of the unloading axis of rotation from the unloading region limit existing in the radial direction of the unloading axis of rotation, and wherein the unloading rotational movement for further continuation of the unloading operation is carried out only under a condition that the radius of the enveloping circle of the unloading unit is less than the radial distance of the unloading axis of rotation from the unloading region limit.

6. A production method, comprising:

machining a workpiece; and after machining the workpiece, unloading a machining product produced by machining the workpiece from a product support by carrying out the unloading method according to claim 1.

7. A mechanical unloading arrangement for unloading a machining product of a workpiece machining operation, comprising:

a product support for the machining product, a transfer drive configured to make available the machining product for unloading on the product support, in that the machining product is configured to be moved by the transfer drive with a transfer movement along a transfer axis into an unloading region of the mechanical unloading arrangement, which has a spatial unloading region limit located along the transfer axis and which has an unloading region length along the transfer axis which is larger than an actual product length of the machining product along the transfer axis, wherein a numerical arrangement control is provided, in which the following are stored: a position of a reference point arranged in the unloading region of the product support; a limit distance, the unloading region limit comprising the limit distance along the transfer axis from the reference point; and a reference length of the machining product, which extends along the transfer axis and is at least equally as large as the actual product length, wherein the numerical arrangement control comprises:

a measuring unit configured to, after a completion of the transfer movement, determine a distance existing along the transfer axis between the reference point and a front end point of the reference length of the machining product in the direction of the unloading region limit;

a comparison unit configured to compare the distance existing along the transfer axis between the reference point and the front end point of the reference length of the machining product with the limit distance from the reference point; and a control unit configured to continue the unloading operation only under a condition that the distance along the transfer axis between the reference point and the front end point of the reference length of the machining product is less than the limit distance from the reference point.

8. A mechanical production arrangement, comprising:

a machining device configured to machine a workpiece and thereby produce a machining product; and a mechanical unloading arrangement configured to unload the machining product of the workpiece machining operation, wherein the mechanical unloading arrangement according to claim 7 is provided as the mechanical unloading arrangement.

9. The unloading method according to claim 1, wherein the workpiece machining operation is a sheet metal machining operation.

10. The production method according to claim 6, wherein the workpiece is a sheet metal.

11. The mechanical unloading arrangement according to claim 7, wherein the workpiece machining operation is a sheet metal machining operation.

12. The mechanical unloading arrangement according to claim 7, wherein the numerical arrangement control is programmable.

13. The mechanical production arrangement according to claim 8, wherein the workpiece is a sheet metal.

* * * * *